United States Patent
Finsterwalder et al.

(10) Patent No.: US 8,354,203 B2
(45) Date of Patent: Jan. 15, 2013

(54) BIPOLAR PLATE FOR FUEL CELLS

(75) Inventors: Florian Finsterwalder, Illerkirchberg (DE); Joerg Kleemann, Ulm (DE); Thomas Kunick, Illerkirchberg (DE); Markus Schudy, Heppenheim (DE)

(73) Assignee: Daimler AG, Stuttgart (DE)

( * ) Notice: Subject to any disclaimer, the term of this patent is extended or adjusted under 35 U.S.C. 154(b) by 480 days.

(21) Appl. No.: 12/532,854

(22) PCT Filed: Apr. 23, 2008

(86) PCT No.: PCT/EP2008/003240
§ 371 (c)(1),
(2), (4) Date: Sep. 24, 2009

(87) PCT Pub. No.: WO2008/141713
PCT Pub. Date: Nov. 27, 2008

(65) Prior Publication Data
US 2010/0167105 A1  Jul. 1, 2010

(30) Foreign Application Priority Data
May 24, 2007 (DE) .......................... 10 2007 024 161

(51) Int. Cl.
*H01M 4/64* (2006.01)
(52) U.S. Cl. ........................................ 429/518; 429/507
(58) Field of Classification Search .......... 429/512–514, 429/517–522, 456–7
See application file for complete search history.

(56) References Cited

U.S. PATENT DOCUMENTS

| 4,324,844 A | * | 4/1982 | Kothmann | 429/434 |
| 2002/0034675 A1 | * | 3/2002 | Starz et al. | 429/42 |
| 2006/0054664 A1 | * | 3/2006 | Strobel et al. | 228/179.1 |
| 2009/0092872 A1 | | 4/2009 | Miyazawa et al. | |

FOREIGN PATENT DOCUMENTS
WO    2007135509 A1    5/2007

OTHER PUBLICATIONS

Office Action issued in corresponding European Application procedure dated Dec. 6, 2010.

* cited by examiner

*Primary Examiner* — Maria J Laios
(74) *Attorney, Agent, or Firm* — Stephan A. Pendorf; Patent Central LLC

(57) ABSTRACT

The invention relates to bipolar plates for fuel cell systems. According to the invention, the component sheets of a bipolar plate (1) are formed for a welded joint (4, 5), such that between the profile regions (6) of the channel ducts (2), only small local surfaces remain as welding zones (10). The above is achieved by means of a corresponding shape of the profile molding (8, 9) of the component sheets. As a result of said reduction of the welding zones to small regions of the total surface, a larger proportion of the area is available for the channels (2), in other words, the channel cross-section and hence the coolant flow can be increased. At the same time the structure for the use of gas diffusion layers made from nonwovens, textiles or paper can be optimized.

Figure 1:
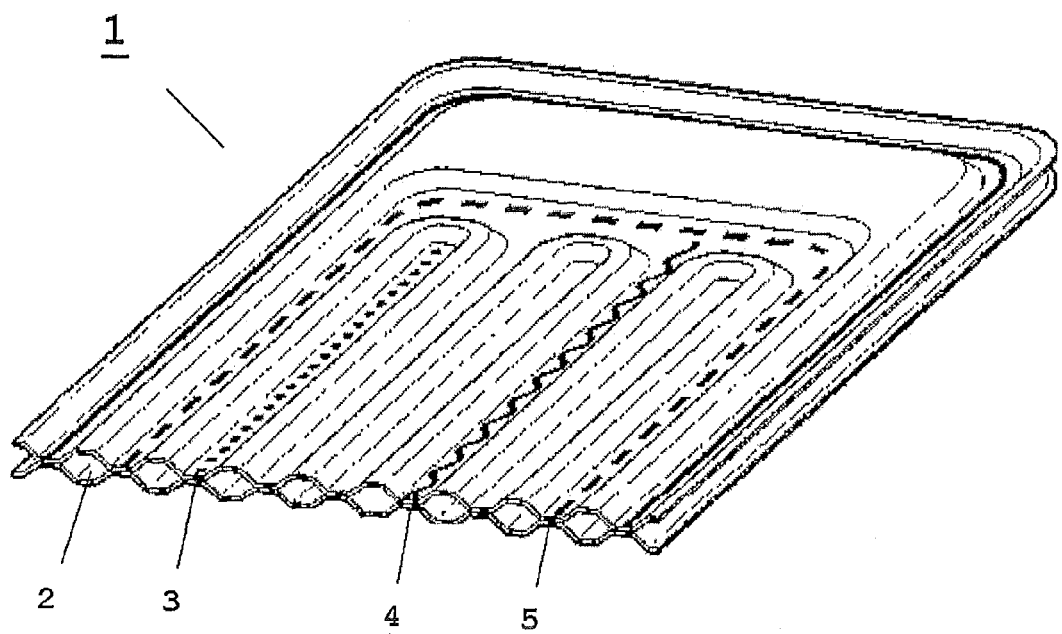

5 Claims, 1 Drawing Sheet ic
BIPOLAR PLATE FOR FUEL CELLS

The invention relates to bipolar plates for fuel cell systems, and methods for the production of such bipolar plates. Fuel cells convert chemical energy to electrical energy. The use of fuel cells for mobile and stationary energy supply is currently developed in an increasing manner. The development of electrically driven vehicles is accelerated due to economic reasons. High-performance fuel cells with a volume and weight as low as possible thereby have a vital importance.

Currently, different types of fuel cells exist, whose principle of operation is generally based on the electrochemical recombination of hydrogen and oxygen to the end product of water. They can be classified according to the type of conductive electrolyte used, the operation temperature level and realizable performance regions. Polymer electrolyte membrane (PEM) fuel cells are especially well suited for automotive uses. In such a PEM fuel cell, the electrochemical reaction of hydrogen with oxygen to water is separated by inserting a proton-conducting membrane between the anode and cathode electrode in the two partial reactions oxidation and reduction. PEM fuel cells are usually operated at a temperature in the region of 50° C. to 90° C.

As the electrical voltage of an individual fuel cell is too low for practical uses, fuel cells analogous to the serial connection of batteries are connected to a stack (stack) of several individual cells placed next to one another, wherein bipolar plates are respectively arranged between the individual fuel cells. The bipolar plates thereby fulfill several objects: the main function is the electric contacting of the electrodes of the individual electrochemical cells or fuel cells and forwarding the current to the neighboring fuel cell. Added to this is the supply of the fuel cells with hydrogenous reaction gases on the one hand and with oxygen (air) and removal of the reaction products (water) via a corresponding distribution structure (formation of transport channels via the electrodes) on the other hand. The continuous discharge of the reaction heat from the stack via the bipolar plates is furthermore very important, as an overheating above the above-mentioned operating temperature region can quickly lead to irreparable damage of the entire fuel cell stack.

So as to fulfill the presented profile requirement, a bipolar plate has to fulfill the following characteristics:
high electrical conductivity;
low transfer resistances;
chemical durability against wet, oxidizing and reducing reactants;
gas tightness;
mechanical loading capacity;
stability;
low weight. The main aims of the further development of the PEM fuel cell are the decrease of the production costs and the increase of the performance density of the aggregates. The necessary potential decrease of the costs cannot be achieved by economies of scale with the expansion of the production capacity alone. The use of economic materials which can be processed easily is also especially imperative.

With regard to the gas diffusion layer (gas-diffusion-layer, GDL), these characteristics are fulfilled by rollable, so-called "low cost" GDLs based on non-woven materials, fabric or paper. Due to their specific material properties, rollable gas diffusion layers, e.g. fabrics or random fiber sheets have a different behavior with the cell composition and the cell operation than thermally bound papers, which have been widespread up to now. They thus show a considerably reduced compression in the channel regions of the flow field due to their comparatively low stiffness, which leads to increased electrical resistances in the material and at the boundary surfaces to neighboring layers due to the material composition. As a consequence of these effects, the ohmic resistance loss within the fuel cell increases and the cell performance decreases. This effect can be reduced drastically by using an adapted filigree web-channel duct with a considerably reduced distance width in the flow field.

Bipolar plates of graphite materials are known amongst others. Their high corrosion resistance is advantageous, and low transfer resistances and a low material density. Graphite has the disadvantage that the bipolar plates have to be processed individually (and thereby expensively) with elaborate methods. These bipolar plates are very susceptible to tensile stress mechanically, which strongly restricts the choice of the molding methods. Due to the brittleness of graphic materials, the mechanical load capacity is additionally often insufficient in automotive uses. Alternatively, bipolar plates of metal with a low corrosion susceptibility are thus preferably manufactured, e.g. of stainless steel, titanium, nickel. These metallic bipolar plates are characterized by a high electrical conductivity, mechanical stability, stability and high gas tightness. Also with regard to the flow field of the fuel cell, a metallic embossed two-part bipolar plate is most likely suitable for serial production with regard to costs and manufacture. It further enables extremely high performance densities by means of the thin design.

For the production a metallic bipolar plate with an additional cooling function, two metal plates can be embossed with a corresponding profile in such a manner, that a channel duct results between them during the two-dimensional folding of the two plates. A coolant can then later be guided over this channel duct in the operating state for discharging the reaction heat. It is thereby advantageous to achieve a coolant flow as high as possible. Metallic bipolar plates are produced with specially developed manufacturing possibilities, the channels of which are molded especially deep. Additional manufacture techniques also allow to further increase the molding ratio of channel width to depth.

With this fabrication of such a bipolar plate of two profile sheets, it is especially important that the electrical contact of both component sheets has a high quality, that is, the connection of the two sheets has to be correspondingly high-quality. For this, the two metal sheets can be connected to one another by a soldering agent. Such a method is for example described in DE 10 2005 020 332 A1. It is disadvantageous hereby on the one hand that soldering flux can reach in the region of the channels and hinder the coolant flow, and on the other hand that a contact can result between the coolant and the solder which can lead to corrosion. As an alternative to soldering, it is known to weld the two sheets to one another. DE 102 21 951 A1 discloses such a method, where the component sheets are connected e.g. by means of laser welding. The planar regions between the profile regions of the channel duct are thereby used as surfaces for the welding processes. The different connection paths which can be produced with such a welding technique are for example continuous, meander-shaped, spot, or quilting seams.

However, the manufacture of an embossed metallic bipolar plate with a filigree channel-web duct adapted for "low cost" GDL is especially problematic. Two effects are essentially opposed to a finer embossing duct. On the one hand, the requirement of an adapted filigree web-channel duct with a clearly reduced distance width in the flow field, on the other hand, the two embossed sheets forming the bipolar plate in the composite have to be connected to one another between the webs by welding. A minimum contact surface of the two sheets is also necessary due to the requirements of the welding technique, so that limits are set for the width of the channels. The yield stress of the embossed material is further limiting, as well as embossing radii, embossing depths, channel-web repeat distance and deformation degree constitute limits for the fineness of the flow field structure.

An optimization thereby results in the fulfillment of conflicting requirements regarding the channel distance with metallic bipolar plates:
a) requirement of a distance width as large as possible to apply a welding joint,
b) requirement of a distance width as small as possible to use cost-optimized GDL materials during the MEA production.

The invention is based on the above-mentioned state of the art. It has the object to develop a bipolar plate for the use in fuel cell systems which ensures a high cooling performance and is especially suitable for "low cost" GDL and which can be manufactured with a simplified manufacturing effort.

This object is solved with a bipolar plate according to the preamble of claim 1 by the characterizing characteristics of claim 1. Further details and advantageous embodiments of the bipolar plate according to the invention are the object of the dependent claims.

The invention suggests to mold the component sheets of a bipolar plate for a welding connection in such a manner, that only locally small surfaces remain as welding zones between the profile regions of the channel guides. This is realized by a corresponding geometry of the profile molding of the component sheets. Part of this is especially the expansion of the channel distance at locations with welding joint at the expense of the web width, so that a welding connection of both plates is only enabled in this region, while the channel-web geometry can be adapted exactly to the requirements of the GDL at locations without welding.

By the reduction of the welding zones to many welding spots or small welding joints over the region of the entire surface, a larger surface part is available for the channels, that is, the channel cross section can be increased, and thus the coolant flow rate. It will be possible at the same time to reduce the width of the channel distance at all other channel locations, and thus to use "low cost" GDL materials with their special properties without the occurrence of the described disadvantages. This characteristic is supported by a specific distribution of the welding joints, so as to realize a good electrical contacting with a low electrical resistance with as few welding joints as possible. The distribution of the welding joints can thereby also orient itself at the distribution of the flow density amongst others, that is, regions having a high flow yield have a higher density at welding spots. Corresponding distributions can be optimized by measurements or simulations. The invention is explained in more detail in the following by means of a preferred embodiment with reference to the drawings and the reference numerals given therein.

Figure 2:
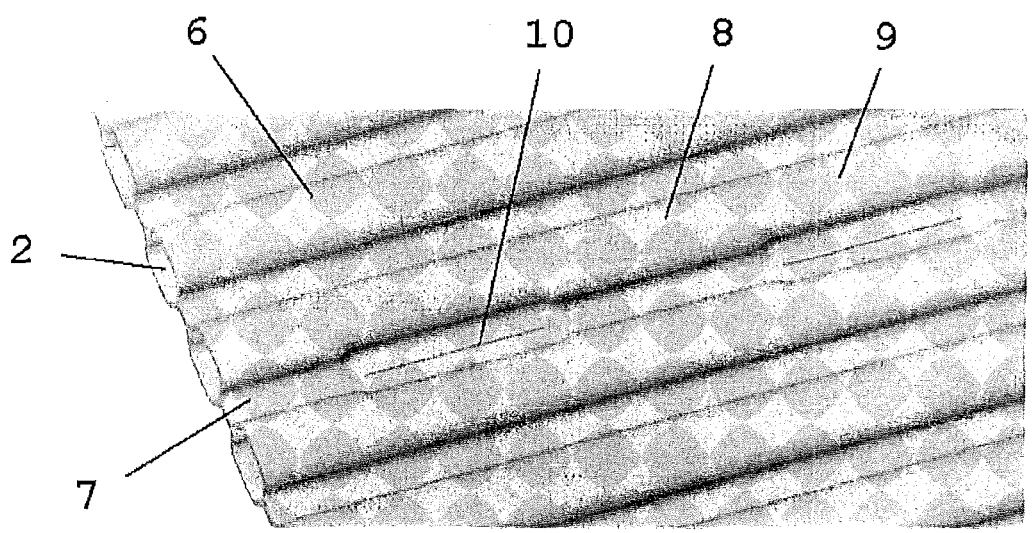

It shows thereby:

FIG. 1 a perspective of a bipolar plate with a channel duct and welding joints according to the state of the art, FIG. 2 a section of a bipolar plate according to the invention.

In FIG. 1 is shown a known bipolar plate (1) corresponding to the document DE 102 21 951 A1. The channel ducts (2) are molded by the corresponding profile of the component sheets. The planar regions (3) between the channels are used as welding zones. The two component sheets are thereby preferably connected to one another via laser welding technique and via interrupted and continuous welding joints (4, 5).

With this technique, a large part of the total surface of the bipolar plate is used as welding area. For an optimization regarding the cooling performance, it is however advantageous to keep the channel ducts as close-packed as possible. According to the invention, the regions for the welding are thus only formed locally between the otherwise closely packed channel ducts.

FIG. 2 shows an embodiment of the bipolar plate according to the invention. The profile regions (6) for forming the channel ducts (2) are here separated only by narrow intermediate regions (7). The profile regions (6) of the channel ducts (2) are tapered (9) slightly with certain distances, so that slightly broader flat zones (10) are formed locally. Welding spots can then be applied in these zones by means of laser, or, as shown in FIG. 2, short welding joints. If only spots are provided as welding connection, the zones (10) can be kept very short in relation to the other profile regions (8).

Depending on the embodiment, normal (8) and tapered (9) regions are arranged along the channel duct with approximately the same distance, but every other distribution of the zones (10) can be given with the profile molding of the component plates. Thereby, many welding points can be distributed over the bipolar plate in a virtually arbitrary arrangement, without restricting the cooling function connected therewith. Additionally, "low cost" GDL can be used, and the connection structures of the bipolar plate can also simultaneously be designed thereupon.

In a broadened embodiment of the apparatus according to the invention, a combination of welding spots and welding joints can also be used, that is, the zones (10) are then formed locally with a corresponding length.

The distribution and the type of the welding connections can for example be defined by taking the occurring flow density distribution over the bipolar plate. Regions with a high reaction rate (inlet region of the fresh reaction gases) can for example have a higher density of welding connections, so that the transfer resistances are especially low here.

The invention offers a bipolar plate for fuel cells which can be produced easily, which has an efficient cooling behavior, is suitable for use of "low cost" GDL materials and can be connected by means of a known welding technique in such a manner that transfer resistances of the flow density distribution can be adapted.

The invention claimed is:

1. A bipolar plate (1) for fuel cells, said bipolar plate consisting of two metal sheets having corresponding profiles in such a manner that a channel ducting comprised of channel ducts (2) is generated between the two metal sheets during joining,
   wherein each metal sheet exhibits profile regions (6) for forming the channel ducts and planar regions (3) between the profile regions in which the planar regions include non-welding zone contact regions as well as welding zones (4, 5) for connecting the metal sheets,
   wherein the metal sheets are only connected by means of individual welding zones (10) distributed over the bipolar plate (1),
   wherein the planar regions are broader and the channel duct width is decreased at the welding zones (10) relative to the non-welding zone contact regions, and wherein the planar regions are narrower and the channel duct width is increased intermediate the welding zones (10) relative to the welding zones.

2. The bipolar plate according to claim 1, wherein welding zones (10) are dimensioned specifically for spot welding connections.

3. The bipolar plate according to claim 1, wherein welding zones (10) are distributed with a different densities over the surface of the bipolar plate (1).

4. A fuel cell comprising alternating individual fuel cells and bipolar plates, with a gas diffusion layer based on non-woven material, fabric or paper provided respectively between adjacent fuel cells and bipolar plates, and wherein the bipolar plates include at least one plate according to claim 1.

5. The bipolar plate according to claim 1, wherein the channel ducting includes channel ducts (2) receiving a higher flow density distribution and channel ducts (2) receiving a lower flow density distribution, and wherein the welding zones (10) are distributed with higher densities over the surface of the bipolar plate (1) in areas corresponding to the higher flow density distribution.

* * * * *